United States Patent
Park et al.

(10) Patent No.: US 9,873,395 B2
(45) Date of Patent: Jan. 23, 2018

(54) VEHICLE AND METHOD OF CONTROLLING THE VEHICLE

(71) Applicant: HYUNDAI MOTOR COMPANY, Seoul (KR)

(72) Inventors: Youngwoo Park, Yongin-si (KR); Hyunwoo Lee, Yongin-si (KR); Haeyoung Kwon, Suwon-si (KR); Minhyuk Oh, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/171,994

(22) Filed: Jun. 2, 2016

(65) Prior Publication Data
US 2017/0129427 A1 May 11, 2017

(30) Foreign Application Priority Data
Nov. 10, 2015 (KR) .................. 10-2015-0157198

(51) Int. Cl.
- *B60R 16/037* (2006.01)
- *B60K 35/00* (2006.01)
- *B60N 2/02* (2006.01)
- *B60R 16/00* (2006.01)

(52) U.S. Cl.
CPC ............ *B60R 16/037* (2013.01); *B60K 35/00* (2013.01); *B60N 2/02* (2013.01)

(58) Field of Classification Search
None
See application file for complete search history.

(56) References Cited

U.S. PATENT DOCUMENTS

| 8,751,065 B1 | 6/2014 | Kato | |
|---|---|---|---|
| 2015/0112512 A1* | 4/2015 | Fan | H04L 67/12 |
| | | | 701/2 |
| 2016/0046300 A1* | 2/2016 | Wingfield | B60W 50/08 |
| | | | 701/48 |
| 2016/0129916 A1* | 5/2016 | Olsen | B60W 40/08 |
| | | | 701/36 |
| 2016/0171797 A1* | 6/2016 | Kim | B60L 3/04 |
| | | | 701/29.2 |

FOREIGN PATENT DOCUMENTS

| JP | 2001-277962 A | 10/2001 |
|---|---|---|
| JP | 2010-058664 A | 3/2010 |
| KR | 10-1406192 B1 | 6/2014 |
| KR | 10-2015-0019201 A | 2/2015 |
| KR | 10-2015-0066892 A | 6/2015 |
| KR | 10-1558762 B1 | 10/2015 |

OTHER PUBLICATIONS

Korean Notice of Allowance dated Feb. 24, 2017 issued Korean Patent Application No. 10-2015-0157198 (with English translation).

\* cited by examiner

*Primary Examiner* — Krishnan Ramesh
(74) *Attorney, Agent, or Firm* — McDermott Will & Emery LLP

(57) ABSTRACT

A vehicle includes a smart key which periodically transmits identification information to an external device, a communication unit which receives information on a driver corresponding to the identification information generated by the smart key from the external device, and a control unit which displays information preset by the driver based on the information on the driver received from the communication unit or automatically controls devices in the vehicle prestored by the driver.

18 Claims, 9 Drawing Sheets

VEHICLE AND METHOD OF CONTROLLING THE VEHICLE

CROSS-REFERENCE TO RELATED APPLICATION

This application claims the benefit of priority to Korean Patent Application No. 10-2015-0157198, filed on Nov. 10, 2015 with the Korean Intellectual Property Office, the disclosure of which is incorporated herein by reference.

TECHNICAL FIELD

Embodiments of the present disclosure relate to a technology for detecting a driver who will actually drive a vehicle when a single vehicle is driven by multiple people and providing information on the detected driver.

BACKGROUND

An automobile is often used as transportation. The number of people using automobiles is increasing. Although in the past, an automobile has had no more significance beyond a means for transportation, with the development of electronic and communication technologies, various convenience systems for improving the convenience of users are being developed by applying the electronic and communication technologies to the automobiles.

As a representative example of such systems, an integrated memory system (IMS) allows a driver to store positions of a seat or a mirror and a steering wheel, etc., wherein when the positions of the seat, back mirror, etc. do not fit due to the car having been driven by a different driver, a button is pressed to automatically adjust the seat, back mirror etc. according to the driver's position.

Also, a cluster design selection (CDS) system consists of a display such as a liquid crystal display (LCD) to allow selecting cluster images according to each driver's preference.

Generally, when a single automobile is co-used by a plurality of drivers, each driver gets in a vehicle and sets a vehicular environment in a corresponding system according to each body condition and stores the settings in a memory button so as not to overlap with other drivers. Then, when a driver is changed, the original driver's information is recalled using the memory button.

However, in such a conventional convenience system described above, unless a user name is directly written on a button, which button belongs to the driver can be confusing, making it necessary to press many buttons or to reset the system.

Also, since it is possible by mistake to over-write an existing memory button set by another driver so that afterwards when another driver presses the memory button, it is necessary to again reset because the setting has changed from the original setting.

Also, when a single vehicle is co-used by a plurality of people, it is impossible to precisely determine who the actual driver of the vehicle currently is, and problems may occur when the vehicle is parked or an emergency occurs. That is, since only one designated contact information is externally displayed in a generally used notice method, when the contact information displayed externally is not that of the actual driver, problems may result. Also, in such a notice method, since it is always possible to see contact information inside a vehicle, there is a disadvantage in that personal information is easily exposed even when unnecessary.

Accordingly, it is necessary to develop a technology capable of automatically providing information on a driver who will actually drive by precisely determining the driver who will actually drive the vehicle and or easily recalling stored information while overcoming such limitations.

SUMMARY OF THE DISCLOSURE

Therefore, it is an aspect of the present disclosure to provide a technology of detecting a person who will actually drive a vehicle using a smart key of the vehicle and an external device without installing an additional device and automatically providing information on a driver externally or setting a vehicular environment according thereto.

Additional aspects of the disclosure will be set forth in part in the description which follows and, in part, will be obvious from the description, or may be learned by practice of the disclosure.

In accordance with one aspect of the present disclosure, a vehicle includes a display unit, a smart key which periodically transmits identification information to an external device, a communication unit which receives information on a driver corresponding to the identification information generated by the smart key from the external device, and a control unit which displays information preset by the driver based on the information on the driver received from the communication unit or automatically controls devices in the vehicle pre-stored by the driver.

The control unit may further include automatically controlling devices in the vehicle pre-stored by the driver based on the information on the driver received from the communication unit.

The identification information may be an identification (ID) of a user of the smart key preset in the external device.

The communication unit may receive no information on the driver from the external device when a distance between the smart key and the external device is a certain distance or more.

The certain distance may be 1 m, 2 m or may be set by the driver.

When the number of received pieces of information on the driver is more than one, the communication unit may receive from the external device only the information on a driver who is closest to the vehicle.

When the number of received pieces of information on the driver is more than one, the communication unit may receive from the external device only the information on a certain driver according to preset criteria.

The criteria may include a last driver of the vehicle, an owner of the vehicle, a newly determined driver, and a certain person designated by the owner of the vehicle.

The preset information may be one of a phone number of a mobile terminal of the driver, a text pre-stored by the driver, and a cluster design preset by the driver.

The display unit may include an electronic panel on which the phone number and the text are displayed.

The preset information may include a cluster design preset by the driver.

The preset information may include a steering wheel position, mirror positions, a brake pedal position, and a seat position of the vehicle pre-stored by the driver.

In accordance with another aspect of the present disclosure, a method of controlling a vehicle, the method includes receiving from the external device information on a driver corresponding to identification information periodically transmitted from a smart key to an external device and displaying information preset by the driver based on the transmitted information on the driver or automatically controlling devices in the vehicle pre-stored by the driver.

In accordance with still another aspect of the present disclosure, a method of controlling a vehicle includes receiving information on a driver corresponding to identification information periodically transmitted from a smart key, displaying information preset by the driver based on the received information on the driver, and automatically controlling devices in the vehicle based on the received information on the driver.

The identification information may be ID of a user of the smart key, preset in the external device.

The receiving of the information on the driver from the external device may include receiving no information on the driver from the external device when a distance between the smart key and the external device is more than a certain distance.

The certain distance may be 1 m, 2 m, or may be set by the driver.

The receiving of the information on the driver from the external device may further include receiving from the external device only information on a driver who is closest to the vehicle when the number of received pieces of information on the driver is more than one.

The receiving of the information on the driver from the external device may further include receiving from the external device only information on a certain driver according to preset criteria when the number of received pieces of information on the driver is more than one.

The criteria may include a last driver of the vehicle, an owner of the vehicle, a newly determined driver, and a certain person designated by the owner of the vehicle.

The preset information may be one of a phone number of a mobile terminal of the driver, a text pre-stored by the driver, and a cluster design preset by the driver.

The displaying of the information may include displaying using an electronic panel on which the phone number and the text are displayed.

The preset information may be a cluster design preset by the driver

The preset information may include a steering wheel position, a mirror position, a brake pedal position, and a seat position of the vehicle pre-stored by the driver.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, a vehicle which detects a driver who actually drives the vehicle using a smart key and an external device and provides driver information according thereto or automatically controls various devices of the vehicle and a method of controlling the same will be described. Embodiments described below may be installed in many types of vehicles, for example, a motorcycle, a motorized bicycle, etc.

Although the title of the present disclosure is vehicle and the method of controlling the vehicle, various terms corresponding to the concept of the present disclosure may also be used for designation thereof. For example, the present disclosure may be designated by various terms generally used by one of ordinary skilled in the art such as a user convenience device setting system and method using a mobile communication terminal and a smart key, a vehicular convenience system using a communication network and a method of providing the same, etc.

Hereinafter, a vehicle in which the present disclosure is installed will be described with reference to FIGS. 1 and 2.

Figure 1:
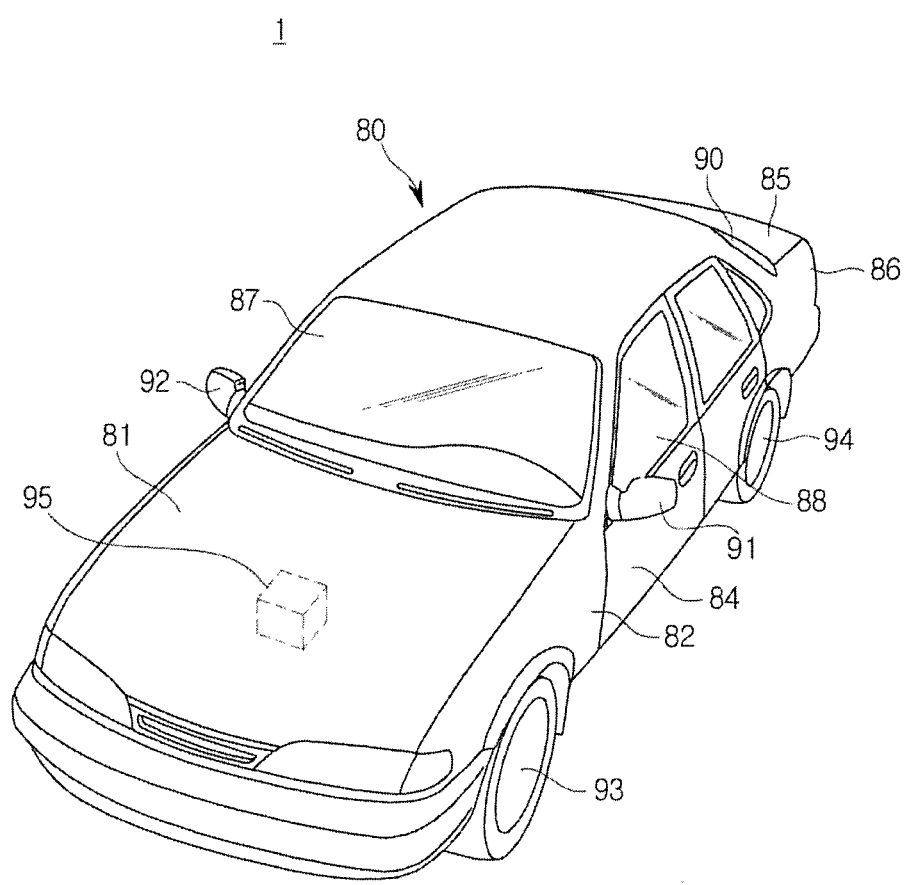
FIG. 1 is an external view of a vehicle in accordance with one embodiment of the present disclosure.

FIG. 1 is an external view of a vehicle in accordance with one embodiment of the present disclosure.

Referring to FIG. 1, a vehicle 1 in accordance with one embodiment may include a body 80 which forms an external shape of the vehicle 1, wheels 93 and 94 which move the vehicle 1, a driving device 95 which rotates the wheels 93 and 94, doors 84 which shield an inside from an outside, a windshield 87 which provides a view in a front direction of the vehicle 1 to a driver in the vehicle 1, side mirrors 91 and 92 which provide a view in the rear direction of the vehicle 1 to the driver, and a rear window 90 installed in a rear of the body 80 to provide the view in the rear direction of the vehicle 1. The body 80 includes a hood 81, front fenders 82, the doors 84, a trunk lid 85, a quarter panel 86, etc.

The wheels 93 and 94 include front wheels 93 provided at the front of the vehicle 1 and rear wheels 94 provided at the rear of the vehicle 1. The driving device 95 provides rotational force to the front wheels 93 and/or the rear wheels 94 so that the body 80 may move forward or backward. The driving device 95 may employ one of an engine which generates torque by burning fossil fuels and a motor generating torque by receiving power from an electric condenser (not shown).

The doors 84 may be pivotably provided on the left and right sides of the body 80 to allow the driver to get into the vehicle 1 when open and to shield the inside of the vehicle 1 when closed.

The windshield 87 is provided on top of the front of the body 80 to allow the driver in the vehicle 1 to obtain visual information from the front direction of the vehicle 1. Also, the side mirrors 91 and 92 include a left side mirror 91 provided on the left side of the body 80 and a right side mirror 92 provided on the right side of the body 80 and allow the driver inside the vehicle 1 to obtain visual information in side and rear directions of the vehicle 1.

In addition, the vehicle 1 may include sensing devices, such as a proximity sensor which senses rear obstacles or other vehicles and a rain sensor which senses the amount of precipitation.

For example, the proximity sensor transmits a sensing signal to the side or rear of the vehicle 1 and receives a reflection signal reflected by an obstacle such as another vehicle. Also, based on a waveform of the received reflection signal, the presence of an obstacle in the rear of the vehicle 1 may be sensed, and a position of the obstacle may be detected. The proximity sensor described above may employ a method of transmitting ultrasonic waves and detecting a distance to an obstacle using the ultrasonic waves reflected by the obstacle.

Figure 2:
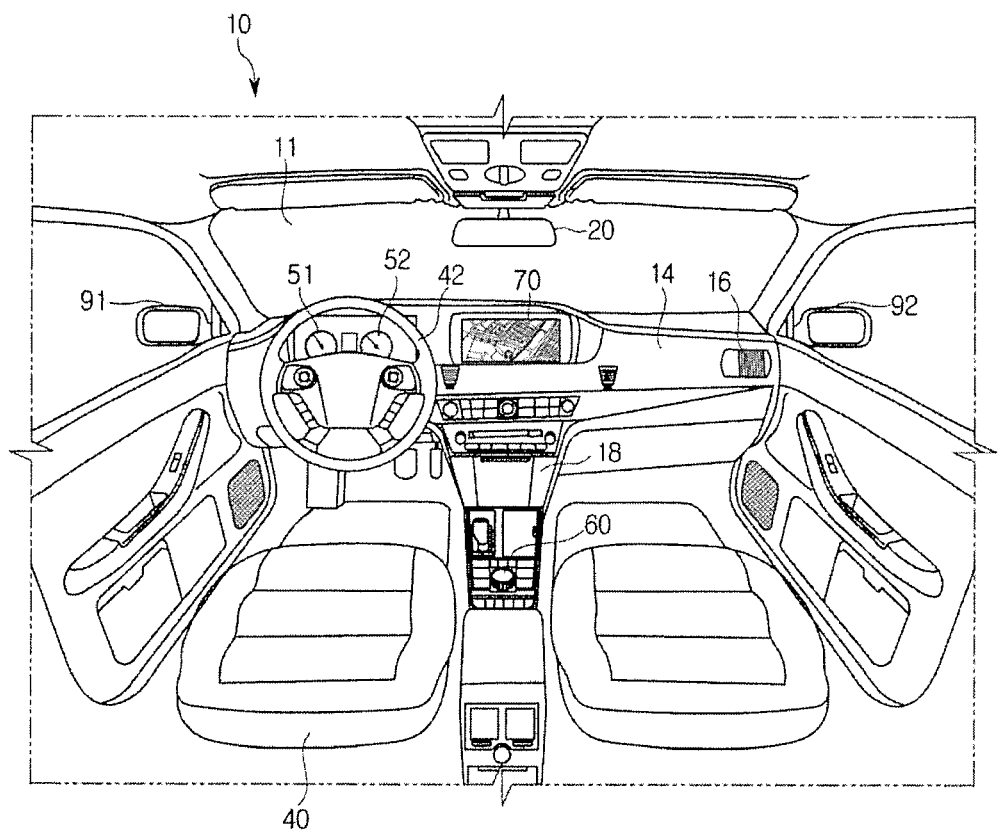
FIG. 2 is an internal view of the vehicle in accordance with one embodiment of the present disclosure.

FIG. 2 is an internal configuration diagram of the vehicle 1 in accordance with one embodiment of the present disclosure. Referring to FIG. 2, components of a vehicle interior 10 will be described in detail.

A telematics terminal (not shown) for communication with the outside may be installed in the vehicle interior 10. The telematics is a compound word formed by combining telecommunication and informatics, which indicates a system for transmitting and receiving an e-mail in a vehicle or searching various pieces of information using the Internet.

The telematics terminal may be formed of a device equipped with all the computer wireless communication satellite navigation functions. Accordingly, the driver may access a telematics server existing outside using the telematics terminal through which various functions such as transmitting and receiving data and images may be used.

Since the telematics terminal is installed in the vehicle interior 10, the telematics terminal is not an external device visible to the driver. However, a user may generally use the telematics function using a display 70 in the vehicle interior 10.

An air conditioning device 16 may be installed in the vehicle interior 10. The air conditioning device 16 means a device that automatically controls an air conditioning environment which includes indoor and outdoor environmental conditions, air intake/exhaust, circulation, cooling/heating states, etc. or controls the same corresponding to a control command of the user. For example, both heating and cooling may be performed, and a temperature of the vehicle interior 10 may be controlled by discharging heated or cooled air through an air vent.

Meanwhile, the vehicle interior 10 may include a dashboard 14 on which various devices for the driver to operate the vehicle 1 are installed, a driver's seat 15 for seating the driver of the vehicle 1, and cluster display portions 51 and 52 which display operation information of the vehicle 1.

The dashboard 14 is provided to protrude from a portion under a wind screen 11 toward the driver, and may allow the driver to operate various devices installed on the dashboard 14 while keeping their eyes forward.

The driver's seat 15 is provided in the rear direction of the dashboard 14 to allow the driver to drive the vehicle 1 in a stable posture while keeping an eye in the front direction of the vehicle 1 and various devices on the dashboard 14.

The cluster display portions 51 and 52 are provided on the dashboard 14 toward the driver's seat 15 and may include a driving speed gage 51 which displays a driving speed of the vehicle 1 and a revolutions per minute (rpm) gage 52 which displays a revolution speed of a power unit (not shown).

Also, the vehicle interior 10 may include a separate jog dial 60 for operating various devices of the vehicle 1. The jog dial 60 may not only perform a driving operation by applying pressure or rotating but also may include a touch pad with a touch recognition function to perform writing recognition for the device operation using a finger of the user or a separate tool with a touch recognition function.

A steering device which operates the driving of a vehicle may include a steering wheel 42 which receives a driving direction input from the driver, a steering gear (not shown) which converts a rotary motion of the steering wheel 42 into a reciprocating motion, and a steering link (not shown) which transfers the reciprocating motion of the steering gear to the front wheels 93. The steering device described above may change the driving direction of the vehicle 1 by changing a direction of a rotating axis of wheel.

A brake system may include a brake pedal (not shown) which receives a braking operation from a driver, a brake drum (not shown) or disc coupled with a wheel, a brake shoe (not shown) or pad which slows a rotation of the brake drum or disc using a frictional force, etc. The brake system described above may brake the driving of the vehicle by stopping the rotation of wheels.

As described above, the external shape and the interior 10 of the vehicle 1 in which the present disclosure is installed will be described with reference to FIGS. 1 and 2. Hereinafter, the present disclosure will be described in detail.

The present disclosure relates to a technology of determining a driver who actually drives using a smart key and an external device and accordingly controlling vehicular information or automatically setting a vehicular environment.

Since the driver who actually drives may be determined using whether the smart key is possessed and the external device, when a single vehicle is driven by multiple people, information may be automatically provided according to the information of the actual driver, and the vehicular environment may be set.

Figure 3:
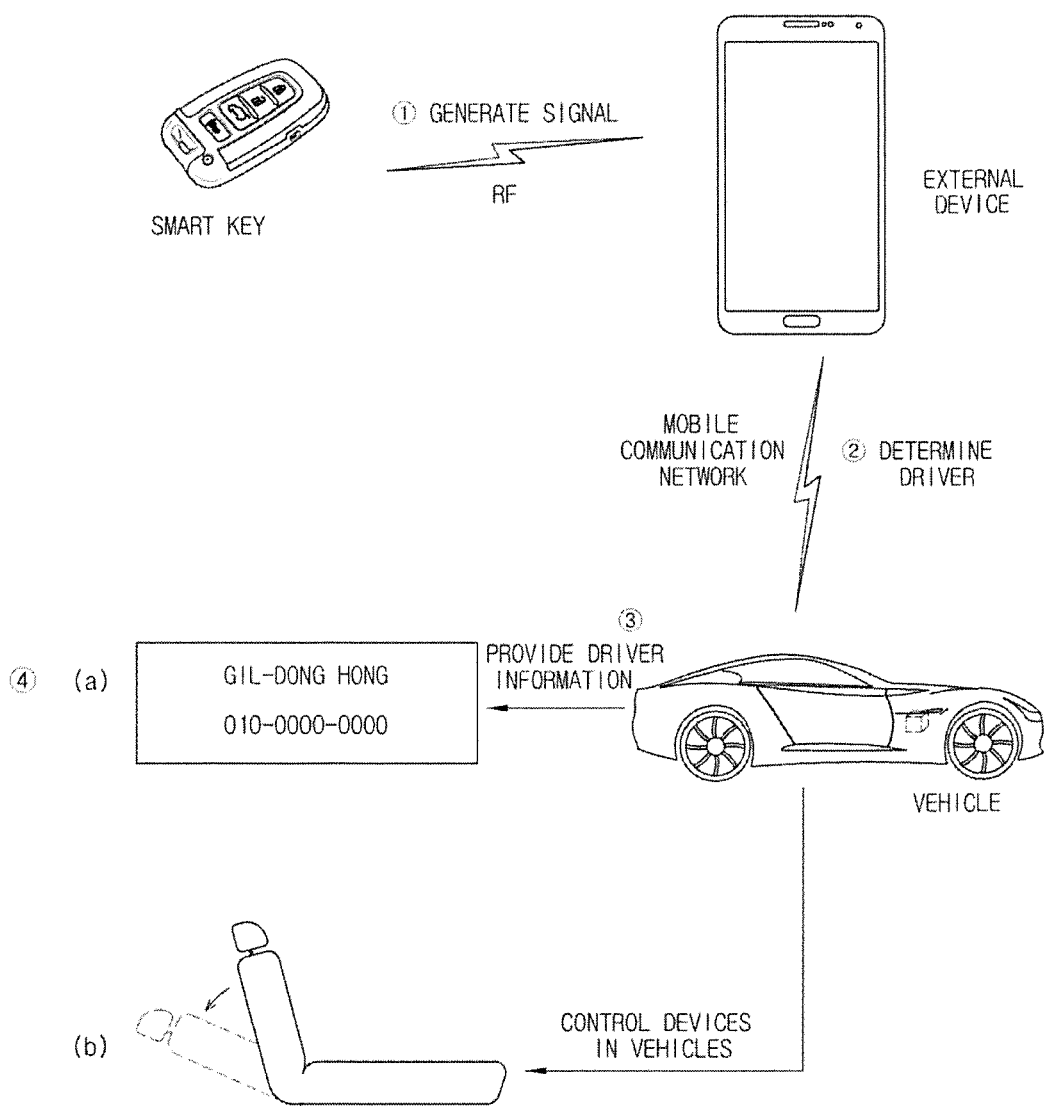
FIG. 3 is a view illustrating an operation process in accordance with one embodiment of the present disclosure.

FIG. 3 is a view illustrating an operation process in accordance with one embodiment of the present disclosure.

The smart key periodically transmits identification information to the external device. Here, the identification information is a signal having information on the smart key and includes information on the vehicle.

When the identification information is transmitted from the smart key, the external device receives the signal. Here, the external device is generally a smart phone but is not limited thereto and may include other external devices capable of receiving identification information and transmitting driver information corresponding thereto to a vehicle.

The external device determines whether the information of the smart key included in the received signal is identical to smart key information pre-stored in the external device. Since drivers who drive the vehicle before the external device receives the signal from the smart key pre-store the smart key information in the external device, respectively, it is possible to determine whether the information transmitted from the smart key is identical to the smart key information pre-stored in the external device.

When the information of the smart key included in the signal received by the external device is identical to the smart key information pre-stored in the external device, the user using the external device may be determined as the driver who actually drives the vehicle, and the information of the determined driver may be transmitted.

A communication unit of the vehicle may receive the information of the driver using a telematics server. The external device may transmit the information of the driver to the vehicle through the telematics server using a communication technology such as mobile communication, etc.

The vehicle receives the information of the driver and, when the received information of the driver has been pre-stored, may display driver information set by the driver or automatically control various devices in the vehicle according to the standards set by the driver.

As shown in FIG. 3, for example, the name and phone number of the driver who will drive the vehicle may be externally displayed, and a seat of the vehicle may be adjusted according to the driver who will drive the vehicle. The above-cited drawing illustrates adjusting the seat in the vehicle. However, the disclosure is not limited thereto. Various devices installed in the vehicle such as a brake pedal, mirrors, a cluster design, etc. may be adjusted as well.

Figure 4:
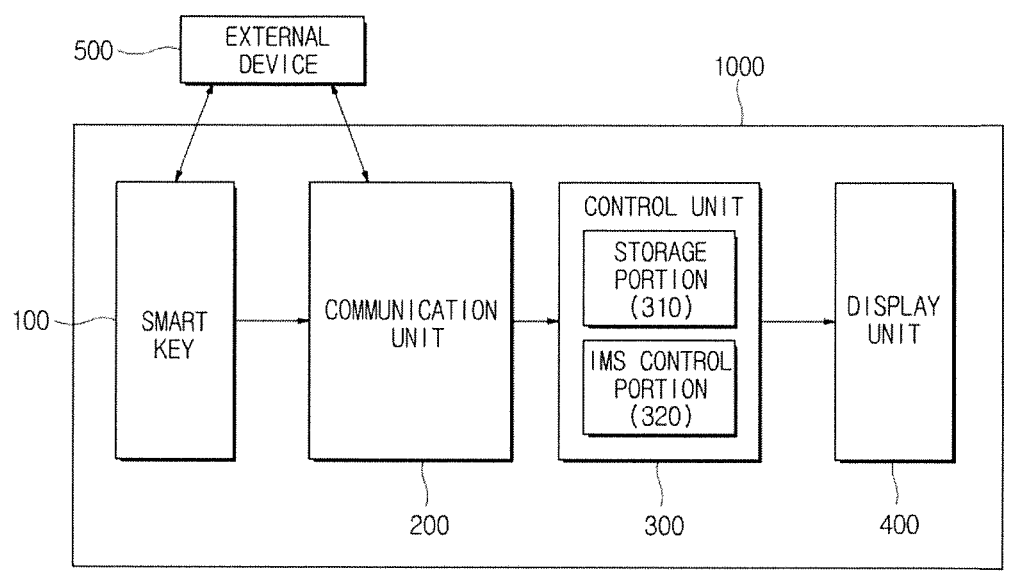
FIG. 4 is a control block diagram illustrating components of a device installed in the vehicle to provide information on a driver in accordance with one embodiment of the present disclosure.

FIG. 4 is a control block diagram illustrating components of a device installed in the vehicle for providing information of a driver in accordance with one embodiment of the present disclosure.

The present disclosure (1000) may include a smart key 100 which communicates with a communication unit 200 and an external device 500, the communication unit 200 which receives various pieces of information from the smart key 100 and the external device 500, and a control unit 300 which transmits to the display unit 400 information set by the driver based on driver information received from the communication unit 200 or controls a vehicular environment according to information set by a user.

The smart key 100 may transmit and receive signals with the external device 500 and the communication unit 200. In the present disclosure, since information of a driver who will actually drive a vehicle is provided to the communication unit 200 using the external device 500, the smart key 100 may communicate not only with the communication unit 200 of the vehicle but also with the external device 500.

Accordingly, the smart key 100 may include a communication module for communicating with the communication unit 200 and the external device 500. The communication module may mean a module for wireless Internet access and local area communication (LAN).

As a wireless Internet technology, wireless LAN (WLAN), wireless fidelity (Wi-Fi), wireless broadband (Wibro), worldwide interoperability for microwave access (WiMax), high speed downlink packet access (HSPDA), etc. may be used. As a LAN technology, Bluetooth, Zigbee, radio frequency identification (RFID), infrared data association (IrDA), ultra-wideband (UWB), etc. may be included.

Accordingly, the smart key 100 may include various circuit boards and devices necessary for performing such wireless Internet communication and LAN communication described above.

The smart key 100 may periodically generate a signal using the communication module. The signal may include information on the vehicle. As will be described below, the external device 500 may determine using the signal the person who will actually drive the vehicle.

The external device 500 may receive the signal periodically generated by the smart key 100. Also, the external device 500 may determine to which vehicle the smart key 100 corresponds by analyzing the received signal, and then may determine whether the information on the smart key 100 is stored in the external device 500. When the information of the smart key 100 is stored in the external device 500, the external device 500 may determine a user of the external device 500 to be the driver who will actually drive the vehicle and may transmit the information of the driver to the communication unit 200.

Accordingly, the external device 500 capable of performing such functions may generally be a smart phone. In the detailed description of the present disclosure, smart phones most easily obtainable by people will be used for promoting an understanding. However, the external device 500 of the present disclosure is not limited to smart phones and may include other external devices capable of performing such functions described above.

For example, a smart watch, a smart gear, a smart glass, a laptop computer, personal digital assistants (PDA), portable multimedia player (PMP), etc. may be included and used.

The communication unit 200 is a component which wirelessly communicates with the smart key 100 and the external device 500 and may perform the functions of receiving the information of the driver who will actually drive the vehicle and transmitting the information of the driver to the control unit 300.

The communication unit 200 may communicate with the smart key 100 using the wireless Internet technology and the LAN technology described for the smart key 100 and may generally communicate with the external device 500 using a mobile communication network.

Generally, the communication unit 200 may include a telematics terminal (not shown). Telematics is a compound word formed by combining telecommunication and informatics, which indicates a system for transmitting and receiving an e-mail in a vehicle or searching various pieces of information using the Internet. Using the telematics, it is possible to transmit and receive various types of data and images. Accordingly, the communication unit 200 may receive the information of the vehicle and driver using a telematics server.

The control unit 300 may include a storage portion 310 and an IMS control portion 320.

When the information of the driver received from the communication unit 200 is present in the storage portion 310, the control unit 300 may transmit to the display unit 400 information preset by the driver or may control various devices in the vehicle according to the standards set by the driver using the IMS control portion 320.

The storage portion 310 stores information on all drivers who may drive the vehicle. Names and phone numbers of the drivers as well as brake positions, seat positions, cluster designs set by the drivers according to their preferences are stored. In addition, texts, particular phrases, map data, phone books, messages, photos, and moving images stored by the drivers may be stored.

Accordingly, to store the above information, the storage portion 310 may include one or more storage media of a flash memory, a hard disc, a multimedia card micro type memory such as a secure digital (SD) memory card and an extreme digital (XD) memory, a random access memory (RAM), a static random access memory (SRAM), a read-only memory (ROM), an electrically erasable programmable read-only memory (EEPROM), a programmable read-only memory (PROM), a magnetic memory, a magnetic disc and/or an optical disc.

When the information of the driver received from the communication unit 200 is present in the storage portion 310, the IMS control portion 320 may control various devices in the vehicle according to the standards set by the driver.

The IMS system indicates a system which automatically adjusts a vehicular environment according to a set environment of the vehicle when the driver gets in the vehicle, having already set a vehicular environment suited for the driver. Other names could include a memory system, a driver's seat memory system, etc.

Using the IMS system, even though a single vehicle is used by multiple people and thus positions of seat and mirrors frequently change, it is possible to automatically restore an original state by only operating a memory switch. Accordingly, even when a driver is changed, it is unnecessary to manually operate positions of seat and mirrors one by one.

Accordingly, the IMS control portion 320 of the present disclosure may, using the IMS system, transmit the name and phone number of the driver or the text or phrase stored by the driver to the display unit 400 and may automatically set various devices in the vehicle according to the standards preset by the driver.

The display unit 400 may externally or internally display the information of the driver received from the control unit 300.

Generally, the display unit 400 may display the name or phone number of the driver, a message by the driver to externally inform, for example, phrases such as "parked for a while", "visitor's vehicle". Accordingly, since it is necessary to allow the information described above to be externally seen, the display unit 400 may be installed in the rear of the wind screen 11 of the vehicle interior 10. However, the display unit 400 is not limited thereto may be installed anywhere in the vehicle interior 10 or exterior.

Since it is necessary to flexibly display short messages, etc., the display unit 400 may be formed of a device capable of performing such a function. An electronic panel may be used for displaying as well as a lighting device, etc. may be used for displaying.

As described above, components of the present disclosure and the functions of the components have been described. Next, a sequence of operations in the present disclosure will be described in detail with reference to FIG. 5.

Figure 5:
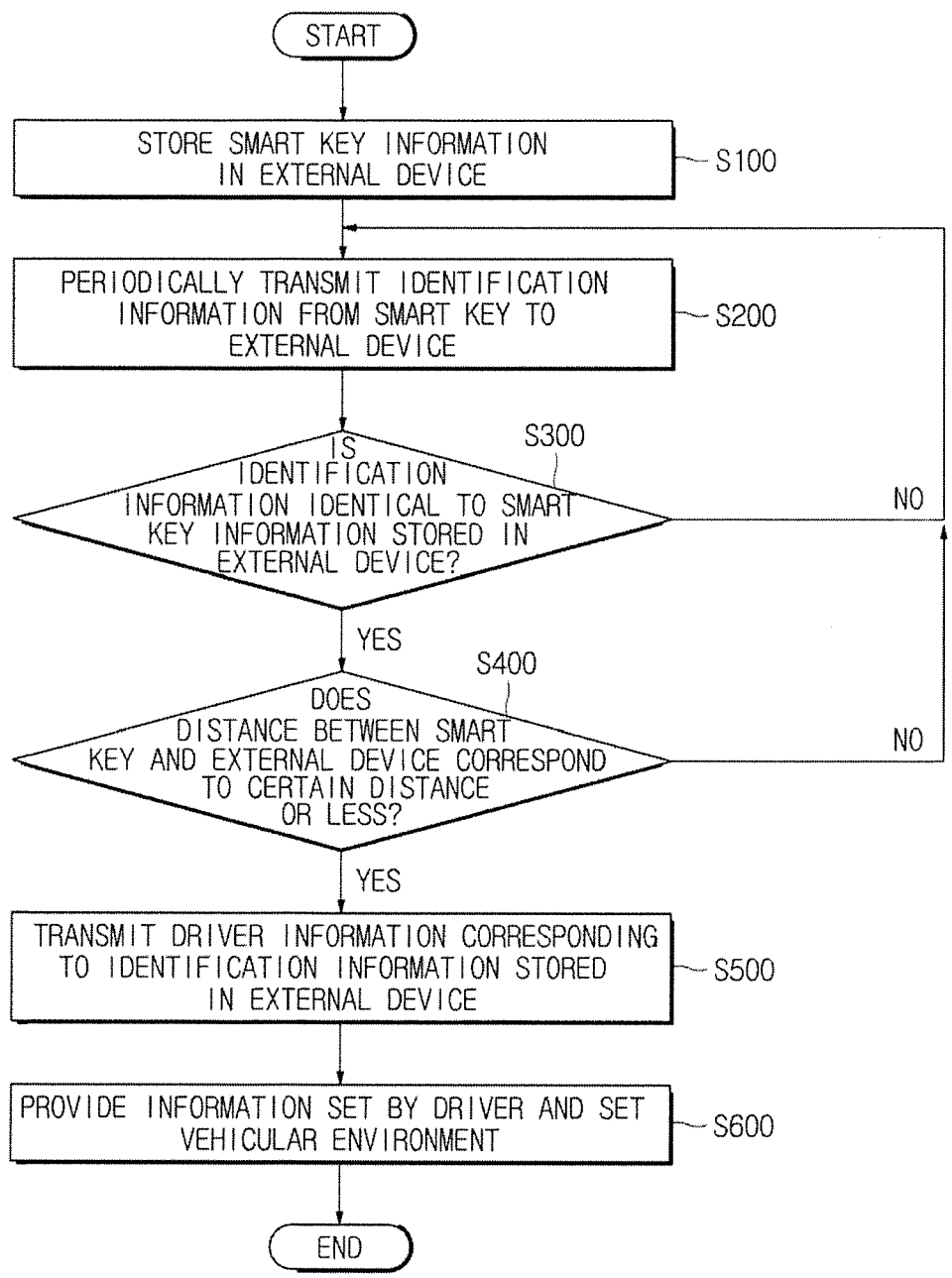
FIG. 5 is a flowchart illustrating a process of providing the information of the driver and a vehicular environment in a method of controlling the vehicle in accordance with one embodiment of the present disclosure.

FIG. 5 is a flowchart illustrating a process of providing information of a driver and a vehicular environment in a method of controlling a vehicle in accordance with one embodiment of the present disclosure.

Before describing the process in detail, for understanding, it will be assumed that the external device 500 is a smart phone which people may easily obtain. However, as described above, the external device 500 is not simply limited to the smart phone but may also include other devices capable of functioning similarly.

In the present disclosure, before the operation, a driver who will drive a vehicle stores information of the smart key 100 in a smart phone of the driver (S100).

The process is for checking whether identification information transmitted from the smart key 100 matches, and the user stores the information of the smart key 100 in a smart phone. In the case of the smart phone, the information of the smart key 100 may be stored using an application.

When the number of drivers who will use the vehicle is one, the information of the smart key 100 is stored in a smart phone of the only one driver. However, when a single vehicle is driven by multiple drivers, it is necessary to store the information of the smart key 100 in each smart phone.

For example, when the vehicle is driven by X who is an owner of the vehicle and Y who is the wife of the owner, it is necessary to register the information of the smart key 100 in the smart phones of X and Y through an application, respectively. When Y does not register the information of the smart key 100 in Y's smart phone, it is impossible to use the present disclosure.

If the information of the smart key 100 is stored in the smart phone, the smart key 100 periodically generates and transmits identification information to an external device (S200).

The identification information is a signal which includes the information of the smart key 100 and may be transmitted using a wireless communication function.

As a wireless communication technology, the wireless Internet technology and the LAN communication technology described above may be used. As examples, Bluetooth, Wi-Fi, Zigbee communication technologies, etc. may be used.

The identification information is identification information which includes the information of the smart key 100, that is, information on the vehicle. For example, the signal transmitted by the smart key 100 may include information such as model A of H company with a number of 0000.

When the external device is a smart phone, because an application may be used, the signal transmitted by the smart key 100 may be an identification (ID) which includes such information (above) or a password.

When the smart phone receives the signal transmitted from the smart key 100, it is determined whether the information of the smart key 100 included in the signal is identical to the information of the smart key 100 stored in the external device 500 or the smart phone (S300).

That is, the operation described above is an operation to determine whether the driver is a person who has a right to actually drive the vehicle, in which it is determined whether the information of the smart key 100 stored in S100 is identical to the information of the smart key 100 transmitted from the smart key 100 to the external device.

In case that the information of the smart key 100 is matched, the user of the smart phone is determined to be the driver who will actually drive the vehicle. However, when the information of the smart key 100 is not matched, the user of the smart phone is determined not to be the driver who will actually drive the vehicle and S200 is performed again.

When X and Y described above approach the vehicle at the same time with the smart keys 100 with X having stored the information of the smart key 100 in X's smart phone and Y not having stored the information of the smart key 100 in Y's smart phone, even though the smart phones of X and Y respectively receive the signals transmitted by the smart key 100, only the smart phone of X is determined to be the smart phone of the driver who will actually drive.

When the information of the smart key 100 is determined to be identical through S300, the smart phone determines whether a distance between the smart key 100 and the smart phone corresponds to a certain distance or less (S400).

A reason of performing the operation is that if the driver is the person who will actually drive the vehicle, the driver in general carries the smart key 100 and the smart phone at the same time. When the operation is not performed, even though different people have the smart key 100 and the smart phone, they may be recognized as identical.

For example, assume that X described above has the smart key 100 to actually drive and the information of the smart key 100 does not exist in the smart phone of X but is present in the smart phone of Y. Then, when X and Y approach the vehicle at the same time, the smart phone may determine an actual driver to be Y, not X, according to S200 and S300. Therefore, through the process S400, the person who will actually drive may be accurately detected.

When the received information of the driver corresponds to more than one driver, the communication unit 200 may determine the driver closest to the vehicle to be driven to be the driver who will actually drive the vehicle. That is, a person located closest to the vehicle has the highest probability of actually driving the vehicle.

For example, when X and Y each have the smart key 100 and the information of the smart key 100 is stored in each of the smart phones, a condition in which both the X and Y may become the driver is satisfied. Accordingly, in this case, according to the present disclosure, the person located nearest to the vehicle is determined to the actual driver and the information of the driver is transmitted to the vehicle.

Also, when the received information of the driver corresponds to more than one driver, a certain driver may be automatically selected according to preset criteria. The last driver of the vehicle, an owner of the vehicle, a newly determined driver, and/or a certain person designated by the owner of the vehicle may be selected as the driver.

For example, when X is determined to be a priority driver always, even though X and Y each have the smart keys 100 and the information of the smart key 100 is in each of the smart phones, X is determined to be the driver, and information on X is transmitted according to the preset criteria.

When the driver who will actually drive the vehicle is determined according to S400, the smart phone transmits information of the driver to the vehicle (S500).

Since the information may be transmitted using the smart phone, a mobile communication network may be generally used. However, the disclosure is not limited thereto, and transmission may occur using other similar communication technologies.

Since the communication unit 200 includes the telematics terminal, the information of the driver transmitted by the smart phone may be transmitted to the vehicle through the telematics server, and the communication unit 200 may receive the information of the user using the telematics terminal.

When the information of the driver is transmitted, the communication unit 200 receives and transmits the information of the driver to the control unit 300. Also, the control unit 300 provides driver information set by the driver or sets a vehicular environment according thereto (S600).

According to S500, the control unit 300 may transmit information preset by the driver determined to be the driver of the vehicle, for example, a name and a phone number of the driver or frequently used texts to the display unit 400 and may control the vehicular environment using the IMS control portion 320 according to the driver information preset by the driver determined to be the driver of the vehicle.

Figure 6:
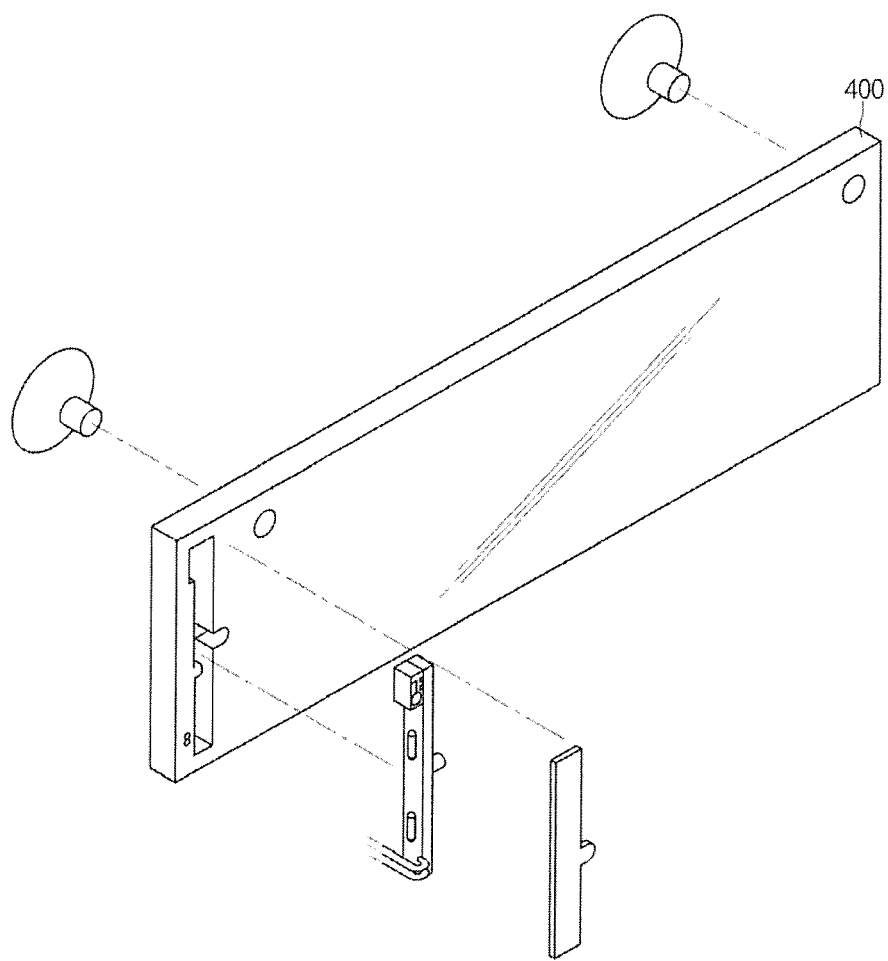
FIG. 6 is an external view of a display unit in accordance with one embodiment of the present disclosure.
Figure 7:
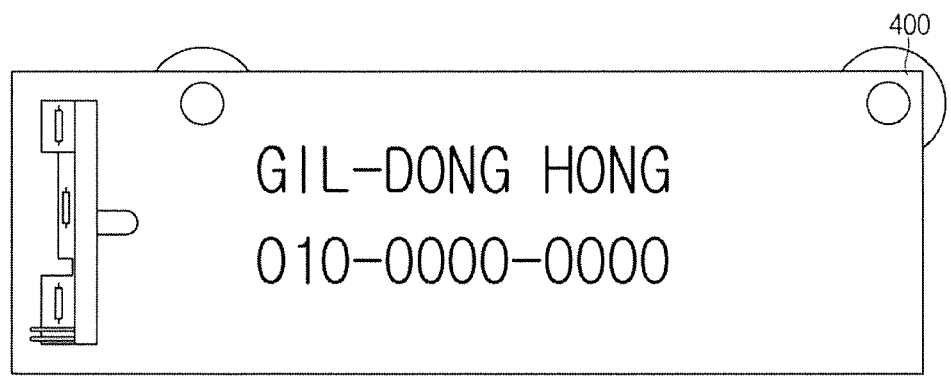
FIG. 7 is a view illustrating the name and phone number of the driver on the display unit in accordance with one embodiment of the present disclosure.
Figure 8:
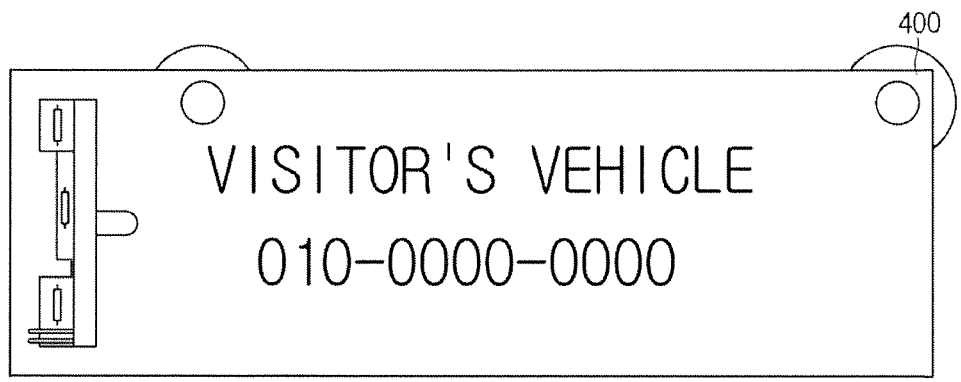
FIG. 8 is a view illustrating a certain text on the display unit in accordance with one embodiment of the present disclosure.

FIGS. 6 to 8 illustrate the control unit 300 externally displaying the information of the driver using the display unit 400.

FIG. 6 is an external appearance of a display unit in accordance with one embodiment of the present disclosure.

The display unit 400 is a component installed to allow information in the vehicle to be externally seen. Since it is necessary to be easily seen from the outside, the display unit 400 may be generally installed on a windshield of the vehicle but is not limited thereto, and may be installed anywhere in the vehicle interior 10 as long as it is possible to be seen from the outside.

It is necessary for the display unit 400 to externally display the information of the driver and thus may be formed of an electronic panel or an LED lamp. Also, to allow the information of the driver to be visible at night, a lighting unit may be provided at a side portion. Components of the display unit are not limited thereto, but may include other structures similar thereto as long as they are able to externally display the information.

FIG. 7 is a view illustrating the name and phone number of the driver on the display unit 400 in accordance with one embodiment of the present disclosure. FIG. 8 is a view illustrating a certain text on the display unit 400 in accordance with one embodiment of the present disclosure.

FIG. 7 illustrates displaying the name and phone number of Gil-Dong Hong when the driver is determined to be Gil-Dong Hong through the operations in accordance with the embodiment of the present disclosure. Even when the phone number of the driver has been changed, the changed number may be displayed after having been preset.

FIG. 8 illustrates a text frequently used by the driver. When the driver frequently visits a certain building, a particular text and phone number may be exposed without exposing the name of the driver.

Also, it is possible to selectively display only the phone number or certain text depending on the style or message that the driver wants to convey.

Figure 9:
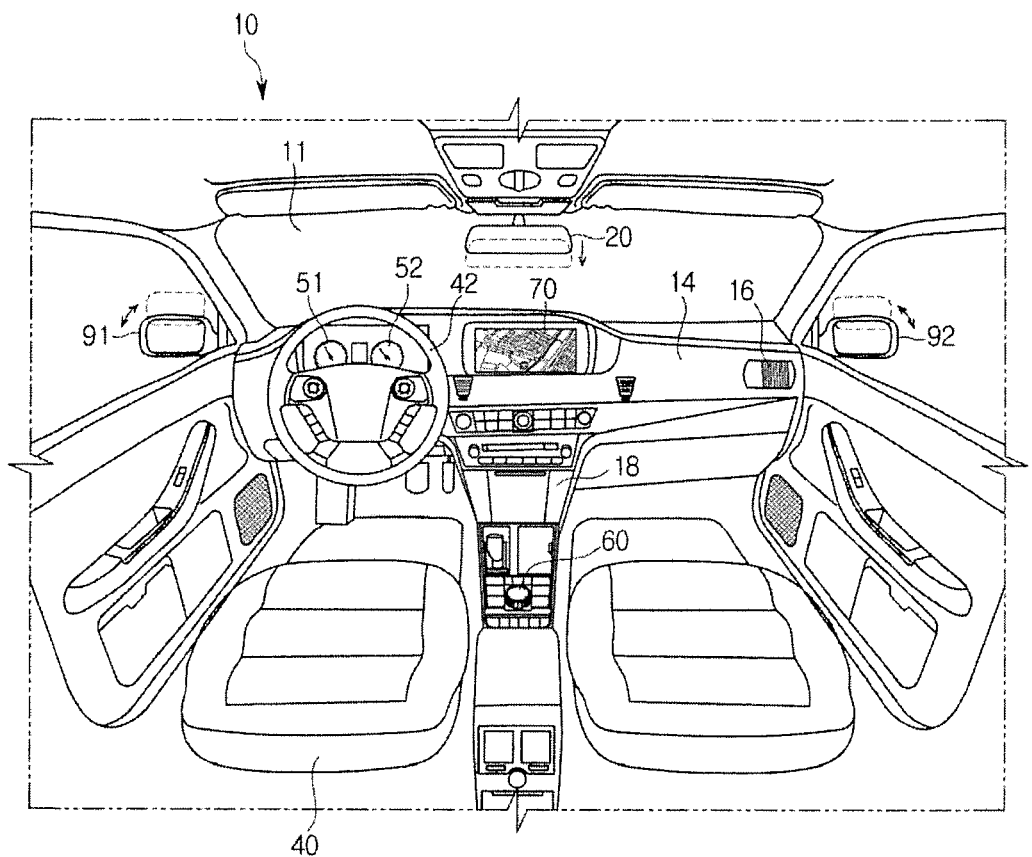
FIG. 9 is a view illustrating an operation of controlling mirrors, etc. of the vehicle in accordance with one embodiment of the present disclosure.

FIG. 9 is a view illustrating an example of controlling mirrors, etc. of the vehicle in accordance with one embodiment of the present disclosure.

FIG. 9 illustrates adjusting the side mirrors 91 and 92 and a room mirror 20. Even though adjusting the mirrors 91 and 92 only is shown in FIG. 9, the control is not limited thereto, and various devices in the vehicle may be controlled. For example, position of a seat back-and-forth, tilt of the seat, height of a headrest, left and right angles of side mirrors, height of a steering wheel, position of a brake pedal, etc. may be adjusted.

Also, a cluster design may be selected. A cluster design selection (CDS) system capable of selecting a cluster image according to driver's preferences may be executed also through the control unit 300. Accordingly, the driver may recall a preferable cluster design.

As described above, according to the embodiment of the present disclosure, even when a single vehicle is driven by multiple people, it is possible to detect a driver who will actually drive and to automatically display information on the actual driver accordingly. Also, when a new driver drives, it is unnecessary to reset a vehicular environment according to the new driver, and the vehicular environment is automatically set, thus improving the convenience of driving the vehicle.

As is apparent from the above description, in accordance with one embodiment of the present disclosure when a single vehicle is driven by multiple drivers, a driver who will actually drive the vehicle may be detected using a smart key and an external device, and information on the driver who will actually drive the vehicle may be provided or a vehicular environment may be set according thereto. Accordingly, the present disclosure removes an inconvenience of a new driver having to reset details of a vehicle one by one or to provide his or her information again.

Also, since an existing smart key and an external terminal used by a driver are used, it is possible to implement the present disclosure without an additional device.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:
1. A vehicle comprising:
a smart key which periodically transmits identification information to an external device;

a communication unit which receives information on a driver corresponding to the identification information generated by the smart key from the external device; and a control unit which displays information preset by the driver based on the information on the driver received from the communication unit or automatically controls devices in the vehicle pre-stored by the driver, wherein when the number of received pieces of information on the driver is more than one, the communication unit receives from the external device only the information on a certain driver according to preset criteria.

2. The vehicle of claim 1, wherein the identification information is an identification (ID) of a user of the smart key preset in the external device.

3. The vehicle of claim 1, wherein the communication unit receives no information on the driver from the external device when a distance between the smart key and the external device is a certain distance or more.

4. The vehicle of claim 3, wherein the certain distance is settable by the driver.

5. The vehicle of claim 1, wherein when the number of received pieces of information on the driver more than one, the communication unit receives from the external device only the information on a driver who is closest to the vehicle.

6. The vehicle of claim 1, wherein the criteria comprises a last driver of the vehicle, an owner of the vehicle, a newly determined driver and a certain person designated by the owner of the vehicle.

7. The vehicle of claim 1, wherein the preset information is one of a phone number of a mobile terminal of the driver, a text pre-stored by the driver and a cluster design preset by the driver.

8. The vehicle of claim 7, further comprising a display unit which comprises an electronic panel on which the phone number and the text are displayed.

9. The vehicle of claim 1, wherein the preset information comprises a steering wheel position, mirror positions, a brake pedal position and a seat position of the vehicle pre-stored by the driver.

10. A method of controlling a vehicle, the method comprising:

receiving from an external device information on a driver corresponding to identification information periodically transmitted from a smart key to the external device; and displaying information preset by the driver based on the transmitted information on the driver or automatically controlling devices in the vehicle pre-stored by the driver, wherein when the number of pieces of received information on the driver is more than one, the receiving of the information on the driver from the external device further comprises receiving from the external device only the information on a certain driver according to preset criteria.

11. The method of claim 10, wherein the identification information is an ID of a user of the smart key preset in the external device.

12. The method of claim 10, wherein the receiving of the information on the driver from the external device comprises receiving no information on the driver from the external device when a distance between the smart key and the external device is greater than a certain distance.

13. The method of claim 12, wherein the certain distance is settable by the driver.

14. The method of claim 10, wherein when the number of pieces of received information on the driver is more than one, the receiving of the information on the driver from the external device further comprises receiving from the external device only the information on a driver who is closest to the vehicle.

15. The method of claim 10, wherein the criteria comprises a last driver of the vehicle, an owner of the vehicle, a newly determined driver and a certain person designated by the owner of the vehicle.

16. The method of claim 10, wherein the preset information is one of a phone number of a mobile terminal of the driver, a text pre-stored by the driver and a cluster design preset by the driver.

17. The method of claim 16, wherein the displaying of the information further comprises displaying using an electronic panel on which the phone number and the text are displayed.

18. The vehicle of claim 10, wherein the preset information comprises a steering wheel position, a mirror position, a brake pedal position and a seat position of the vehicle pre-stored by the driver.

* * * * *